Nov. 24, 1970   C. S. PHELAN   3,543,065

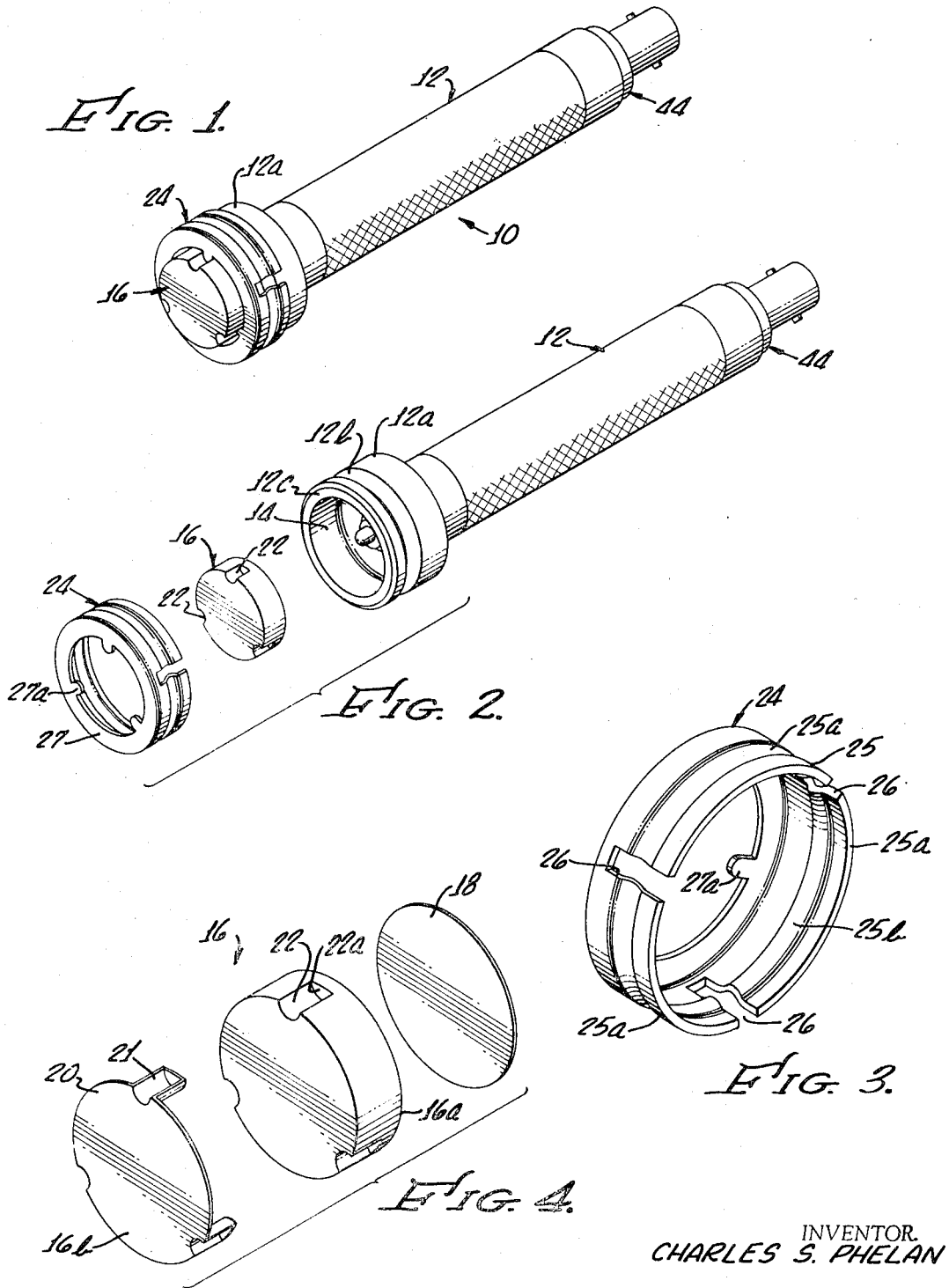

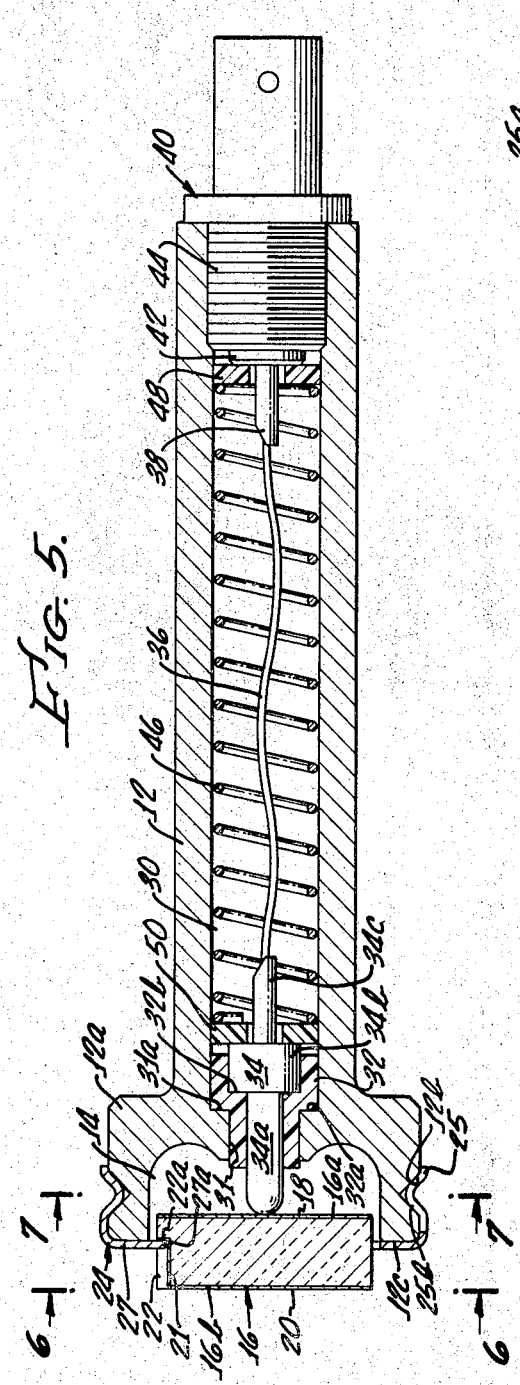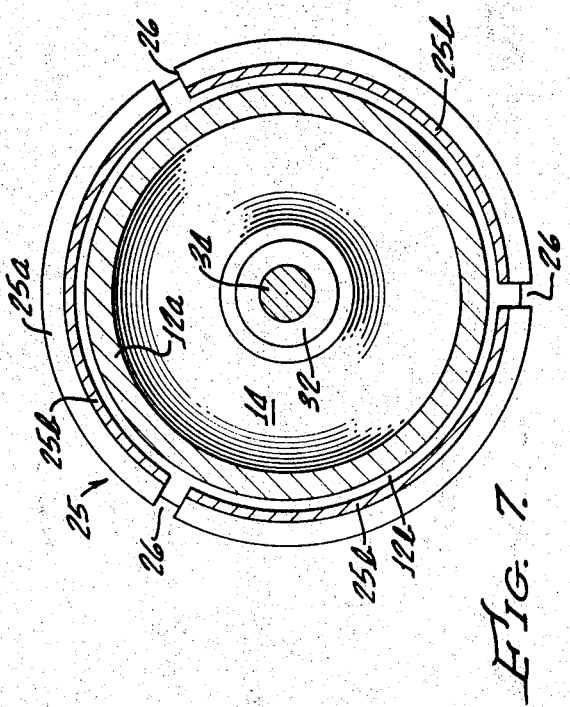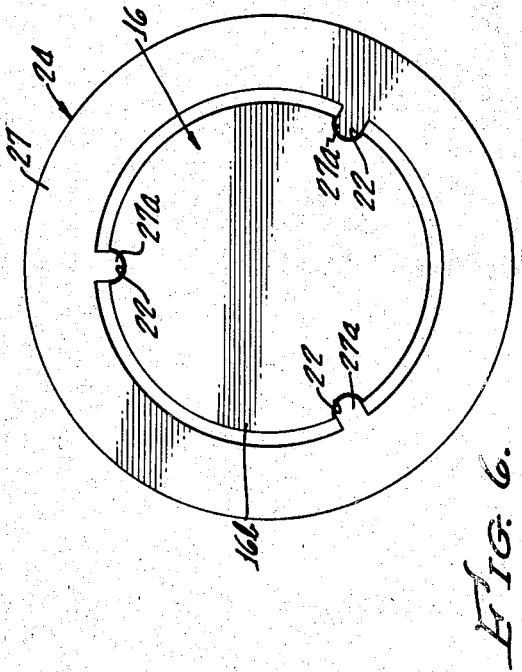

PROBE FOR BOND TESTER

Filed Sept. 26, 1968   4 Sheets-Sheet 4

INVENTOR.
CHARLES S. PHELAN

BY FOWLER, KNOBBE
& MARTENS
ATTORNEYS.

United States Patent Office 3,543,065
Patented Nov. 24, 1970

3,543,065
PROBE FOR BOND TESTER
Charles S. Phelan, Tustin, Calif., assignor to Shurtronics Corporation, a corporation of California
Filed Sept. 26, 1968, Ser. No. 762,689
Int. Cl. H04r 17/00
U.S. Cl. 310—9.4   7 Claims

ABSTRACT OF THE DISCLOSURE

A short cylindrical piezoelectrical crystal is loosely positioned by a plurality of fixed, rigid guides which fit within axially extending slots in the exterior of the crystal. The guides are attached to a cap which snaps onto the end of a probe or are individually and adjustably mounted on a support surrounding the crystal. In another arrangement, the guides are formed on an elongated tubular element which spaces the crystal away from a support member. In another arrangement, the crystal is loosely positioned by a coil spring retaining ring which fits within grooves formed in the crystal and a surrounding probe.

BACKGROUND OF THE INVENTION

This invention relates to various improved arrangements for supporting a piezoelectric crystal or other transducer used in ultrasonic testing devices.

Ultrasonic testing devices provide a convenient means for non-destructively testing the quality of a manufacturing process without adversely affecting the quality of the work which has been performed. Such devices are particularly useful for testing the quality of adhesive bonds between large metal sheets such as may be used in the fabrication of aircraft bodies. Typically, in an ultrasonic bond tester, a piezoelectric crystal is placed in contact with the test item through the medium of a suitable fluid couplant and the transducer is then excited at its natural resonance by applying a voltage across the transducer. The electrical impedance of the transducer is affected by the nature of the mechanical impedance of the test item in contact with the transducer. The difference in impedance between a satisfactory bond between the metal layers in the test item and an unsatisfactory bond indicates the quality of the bond. Hence, in this fashion the unsatisfactory areas can be detected.

Since the piezoelectric crystal is a poor electrical conductor, an electrical coating is placed on the flat end surfaces of the crystal so that a low voltage may be applied across the crystal. To complete the circuit of the outer face of the crystal, a coating of electrically conductive material extends in paths along the outer cylindrical surface of the crystal to the means engaging the sides of the crystal to support it, the support means forming a portion of the electrical circuitry.

In one known arrangement, the crystal is held by a plurality of spring metal fingers which extend into grooves formed in the outer surface of the crystal and grip the crystal. The flexible spring fingers provide adequate support for the crystal while permitting the crystal to move to accommodate the test surface; however, the movement of the crystal with respect to these spring fingers causes the rather small ends of the gripping fingers to scratch the transducer with the result that eventually the electrically conductive coating in the axial grooves is removed. This, of course, causes failure of the electrical circuit so that the test equipment does not function properly and the crystal must be replaced with one having the proper coating. The crystals are relatively expensive but more importantly, the overall test equipment and the product being tested is quite expensive and the time lost while the equipment is being repaired represents a serious loss. Accordingly, it is desirable that the means for holding the crystal be improved to eliminate this weakness.

SUMMARY OF THE INVENTION

In accordance with the invention, a cylindrical transducer, such as a piezoelectric crystal of the type discussed above, is formed with groove means in its outer cylindical surface and with electrically conductive material formed thereon and on the outer face of the transducer with a conductive path extending between the groove means and the outer face. The transducer is loosely positioned and guided by guide means which cooperate with the groove means to permit limited movement of the transducer in a holder with a minimum of friction on the transducer so as to maintain the integrity of the coating within the groove means.

In one form of the bond tester the guide means includes a tubular holder or probe having an outer socket for receiving the transducer and a cap is snapped onto the end of the probe, with the cap having rigid guides which extend into axially extending grooves formed in the exterior of the transducer. The dimensions of the guides with respect to the transducer is such that the transducer can have limited movement but the electrical coating in the grooves is not impaired by the guides.

In a bond tester having a multiplicity of transducers arranged in a pattern on a movable head, it is important that the crystals be accurately positioned. Hence, the guides which extend into the axial grooves in the transducer may be formed as individual elements that may be arcuately and radially adjusted to obtain the desired precise alignment. In the multiple arrangement, many of the transducers utilized are extremely short and when the test item has a curved surface it is necessary that the transducers extend beyond their supporting members sufficiently far to accommodate the curved surface. Hence, in another form of the invention each transducer in the multiple arrangement is positioned by an elongated tubular element which rides loosely within a support surface and is in turn formed with a plurality of inwardly extending guides which loosely fit within the grooves in the transducer.

DESCRIPTION OF THE DRAWINGS

FIG. 1 is a perspective view of an ultrasonic probe assembly illustrating one form of the invention;

FIG. 2 is an exploded perspective view of the assembly of FIG. 1 illustrating the manner in which the cap and the transducer are assembled to the remainder of the probe assembly;

FIG. 3 is a perspective view illustrating the detail of the cap of FIG. 2;

FIG. 4 is an exploded perspective view of the transducer of FIG. 2;

FIG. 5 is a longitudinal cross-sectional view of the probe assembly of FIG. 1;

FIG. 6 is an end view of the assembly of FIG. 5 along the lines 6—6 of FIG. 5;

FIG. 7 is a cross-sectional view on the line 7—7 of FIG. 5 illustrating the manner in which the retaining cap is secured to the end of the probe assembly;

DETAILED DESCRIPTION OF THE PREFERRED EMBODIMENT OF THE INVENTION

Figure 8:
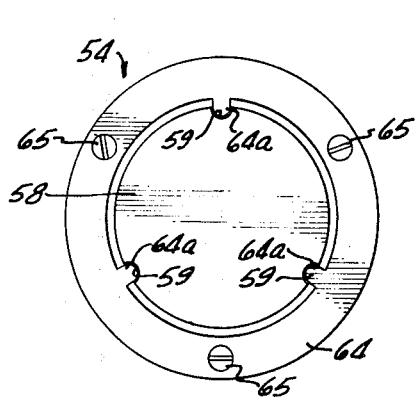
FIG. 8 is an end view of a probe assembly illustrating another means for supporting a transducer.

Referring first to FIGS. 1–7 there is shown a single transducer probe assembly 10 having an elongated tubular metal probe or handle 12 sized to be conveniently gripped with one hand by the user of the equipment. The left end 12a of the probe 12, as viewed in FIGS. 1 and 5, has an enlarged diameter which is open at its outer end to form a socket 14. The outer periphery of the enlarged head 12a is formed with an annular groove 12b which is spaced from the outer face 12c of the probe head 12a.

Positioned within the socket 14 is a piezoelectric crystal transducer 16 in the form of a short cylindrical element or disc. The crystal can be made of a variety of materials one suitable substance being barium titanate ceramic ($BaTiO_3$). On the inner face 16a of the transducer there is formed an electrically conductive layer 18, as best seen in FIGS. 4 and 5. A similar conductive layer 20 is formed on the outer face 16b. In the outer periphery of the transducer 16 there are formed three equally spaced axially extending grooves 22 which extend from the outer transducer face 16b and terminate in a shoulder 22a spaced from the rear face 16a. The grooves 22 are also formed with an electrically conductive coating 21 which forms a conductive path in connection with the coating 20 on the outer face 16b.

In accordance with the invention, there is provided a generally tubular cap 24 made of electrically conductive material. This cap includes a depending annular skirt 25 which fits over the outer end of the probe head 12a and is divided into a plurality of arcuate segments 25a separated by axial slits 26 which open to the inner end of the cap. The skirt 25 is formed with an inwardly extending annular rib or ridge 25b which fits within the annular groove 12b formed in the probe head 12a. Due to the presence of the slits 26 and the flexibility of the segments 25a, the cap 24 may be simply snapped onto the probe head in the position shown in FIG. 5.

The outer face of the cap 24 includes an inwardly extending flange 27 having three inwardly extending guides 27a which are arcuately spaced to be aligned with the grooves 22 formed in the transducer 16. The inner ends of the guides 27a define a circle with a diameter smaller than the outer diameter of the transducer 16 so that the inner ends of the guides 27a engage the shoulders 22a marking the inner ends of the grooves 21. The circle defined by the inner ends of the guides 27a is, however, slightly larger than the circle defined by the inner edges of the grooves 22 with the result that the transducer is loosely positioned by the guides. As can be seen from FIG. 6, the inner ends of the guides 27a are rounded to conform to the shape of the grooves 22 to further enhance the positioning of the transducer.

Referring now to FIG. 5 for a description of the remaining elements within the probe assembly 10, it can be seen that the tubular probe 12 has an inner passage 30 which extends therethrough and is in communication with the socket 14 by means of a throat 31 of reduced cross section which forms a shoulder 31a. A tubular insulating bushing 32 is positioned with one section in the throat 31 and a larger section in the passage 30. The bushing 32 also has a shoulder 32a which mates with the shoulder 31a to prevent the outward movement of the bushing 32. A conductor pin 34 is positioned within the bushing 32 with an elongated portion 34a extending through the throat section of the bushing so that its rounded forward tip engages the conductive coating 18 on the transducer 16. An enlarged flange portion 34b of the conductor pin 34 is positioned near a shoulder 32b of the bushing 32 to limit the outward movement of the conductor pin; however, there is sufficient clearance such that the shoulder 32b does not prevent good contact of the tip of the pin and the transducer coating.

A rearwardly extending portion 34c of the conductor pin 34 is connected by a flexible conductor 36 to the internal conductor pin 38 of a coaxial cable connector 40. The pin 38 is mounted within an insulated bushing 42 which in turn is positioned within the outer sleeve 44 of the connector assembly 40. The outer surface of the forward portion of the connector sleeve 44 is threaded into the rear of the probe 12 while the rear portion of the connector 44 extends rearwardly to mate with a coaxial cable (not shown).

To bias the forward conductor pin 34 forwardly towards the transducer 16, there is provided an elongated compression spring 46 which rides within the passage 30 surrounding the conductive wire 36. The rear end of the spring 46 bears against an insulated washer 48 which bears against the insulated bushing 42. The forward end of the spring 46 bears against an insulated washer 50 which engages the enlargement 34b of the forward conductor pin 34.

The electrical circuit through the probe assembly 10 is as follows: a voltage applied to the internal conductor pin 38 of the coaxial connector 40 is transmitted through the conductor 36 and the conductor pin 34 to the rear electrical coating 18 on the transducer 16. The voltage is thus applied across the transducer faces with the remainder of the circuit being completed by the forward coating 20 on the transducer, the coating 21 in the axially extending grooves 22, the inwardly extending guides 27a with in the grooves 22, the retaining cap 24, the probe 12 and the outer sleeve 44 of the coaxial connector assembly 40 connected to a coaxial cable leading to a power supply.

In operation, the user grasps the probe assembly 10 by its handle 12 and places the transducer 16 in contact with the surface of the test item. Coupling fluid (not shown) is normally applied to the surface of the test item so that good contact is made between the probe transducer 16 and the test item. The elecrical impedance of the transducer is affected by the mechanical impedance of the test item. The readings of the voltage applied across the transducer vary in accordance with the characteristics of the test item. Any imperfections in the bond between the layers of the test item can be indicated in this fashion.

In placing the transducer 16 against the surface of the test item, it is desirable that the forward surface of the transducer be as parallel as possible to the surface of the test item to insure a good contact. However, it is, of course, difficult to place the transducer quite so perfectly particularly with curved surfaces. Thus, it is desirable that the transducer have some freedom of movement within its retaining guides 27a so that the transducer can best adjust to the surface of the test item. As a result, the transducer 16 may be cocked somewhat within the retaining guides 27a but yet a proper reading can be obtained with the probe assembly.

It is also difficult to apply the transducer to the test item with just the right amount of force. While the degree of force applied is not critical, it is desirable that the transducer 16 be movable rearwardly to some extent so that none of the components will be damaged if excess force is applied. Thus, if excess force is applied to the transducer 16 it can move rearwardly against the conductor pin 34 and the resiliency of the compression spring 46, the guides 27a of the retaining cap 24 permitting this rearward movement in combination with the slots 22 in the transducer 16. This relative movement between the transducer and the retaining cap is needed to accommodate pressure applied to the transducer and to accommodate the surface of the test item.

The guides 27a therefore must continue to position and guide the transducer during this repeated relative movement between the transducer and the guides. At the same time, it is necessary that electrical continuity be maintained between the coating 21 in the slots 22 and the guides 27a. It is essential that the guides do not scratch or wear away the coating 21. With the arrangement disclosed, the guides only slightly engage the coating so that they do not degrade the quality of the coating during repeated relative movement of the two components. It should be noted that if one guide 27a is spaced slightly from the conductive coating 21 in the grooves 22, one or the other or both of the other two guides will be in contact with the coating, thus insuring adequate electrical connection. In most situations, there will be constantly some contact between each of the guides 27a and the electrical coatings 21.

In the event it is necessary to ever replace the transducer 16 with a new one or with a transducer of different characteristics to accommodate a given situation, it is very easy to simply snap off the cover 24 from the enlarged head 12a of the probe in that the flexible segments 25 of the cap can move outwardly from the annular groove 12b to permit removal. Once the cap is off, the transducer can, of course, be simply removed from the cap.

Figure 9:
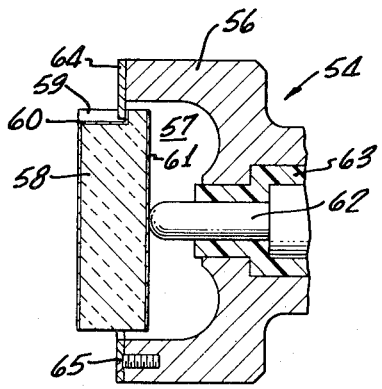
FIG. 9 is a cross-sectional view of the modification shown in FIG. 8.

In FIGS. 8 and 9, there is illustrated the front portion of a probe assembly 54, the rear portion of which is not shown, being the same as the assembly 10 in FIGS. 1–7. The forward end of the probe 56 is formed with a socket 57 in which is positioned a transducer 58 having a plurality of axially extending grooves 59 opening to the forward face of the transducer 58. The grooves 59 and the forward face of the transducer are provided with an electrical coating 60. The rear face of the transducer is also provided with a coating 61 which is in contact with a conductor pin 62 positioned within an insulated bushing 63 mounted within the probe 56. An annular retaining plate 64 is attached to the forward end of the probe 56 by three screws 65 that are threaded into the probe 56. Formed integrally with the plate 64 are three inwardly extending rigid guides 64a which are arcuately spaced to be aligned with the grooves 59 in the transducer 58. The guides 64a are dimensioned and spaced so that the transducer is loosely positioned by the guides to permit a limited amount of movement of the transducer relative to the guides without causing excessive wear of the electrical coating 60 in the grooves 59.

Figure 10:
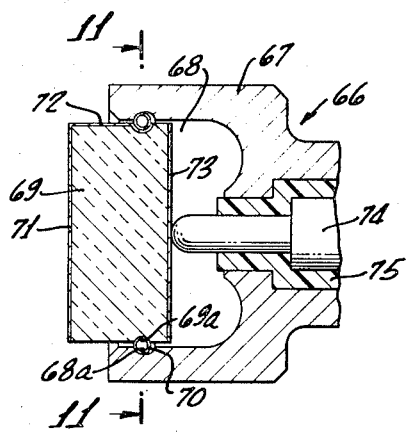
FIG. 10 is a cross-sectional view of a probe assembly illustrating yet another means for supporting a transducer.
Figure 11:
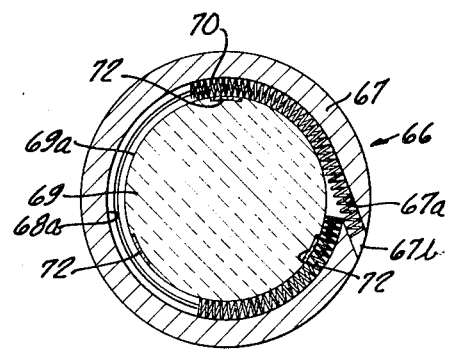
FIG. 11 is a cross-sectional view on lines 11—11 of FIG. 10.

There is illustrated in FIGS. 10 and 11 another form of the invention wherein a probe assembly 66 is provided with a probe head 67 having a forward socket 68 receiving a transducer 69. The inner wall of the socket 68 is formed with an annular groove 68a and the outer wall of the transducer is formed with a mating, but slightly smaller, annular groove 69a. A passage 67a which is tangetial to the groove 68a extends through the wall of the socket 68. A coil spring or slightly undersized wire spline 70 is inserted through the passage 67a and arranged in the form of a ring within the grooves 68a and 69a. A screw or plug (not shown) may be provided to keep the spring in the grooves.

The transducer is formed with an electrically conductive coating 71 deposited on its outer face, and three coating strips 72 extend axially on the outer sides of the transducer from the coating 71 into the annular grooves 69a to form a conductive path between the coating 71 and the coil spring or wire spline 70. The rear surface of the transducer 69 is also formed with an electrically conductive coating 73 which contacts the conductor pin 74 mounted in an insulated bushing 75.

In use, the flexible coil spring or slightly undersized wire spline 70 serves as a retaining ring which adequately retains the transducer within the probe head while permitting limited cocking and axial movement of the transducer 69 without degrading the electrical coating strips 72 which extend into the annular grooves 69. Although the retaining ring 70 has considerable contact with the transducer, it is very loose contact, such that the conductive coating strips 72 are not worn away as the transducer is moved relative to the probe head 67. Also, the loose fit insures that the retaining ring does not apply a transverse pressure which would tend to affect the resonance of the transducer.

Figure 12:
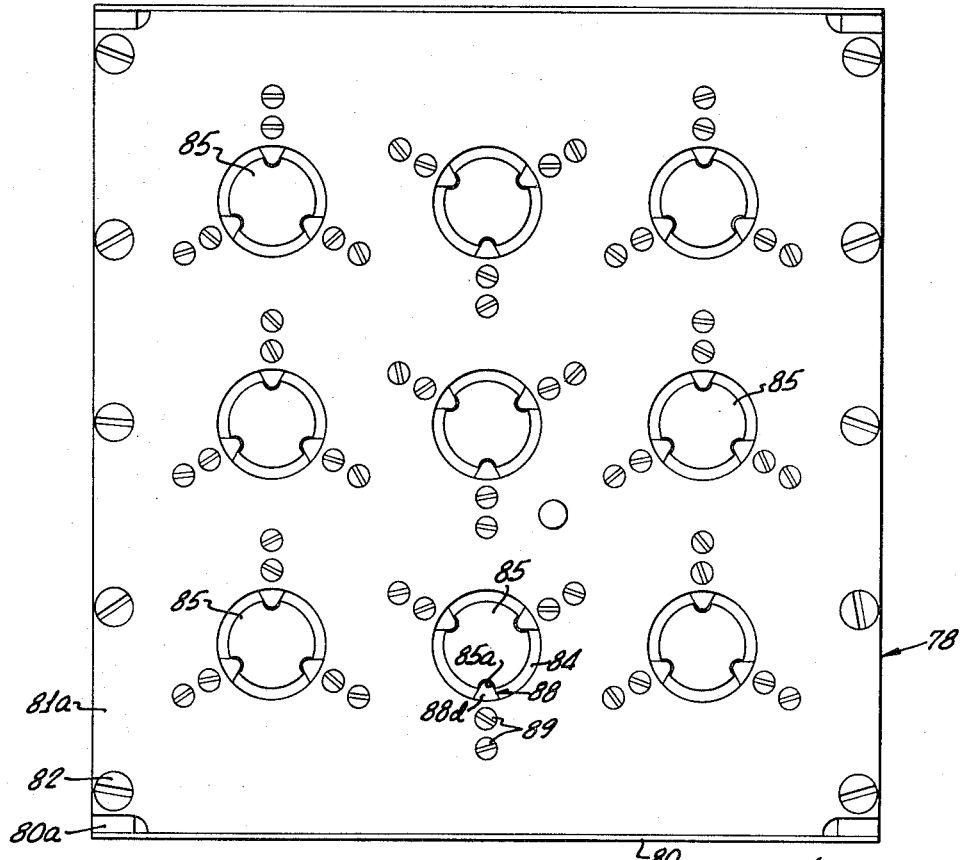
FIG. 12 is a plan view of a multiple transducer head embodiment showing individually mounted guides.
Figure 13:
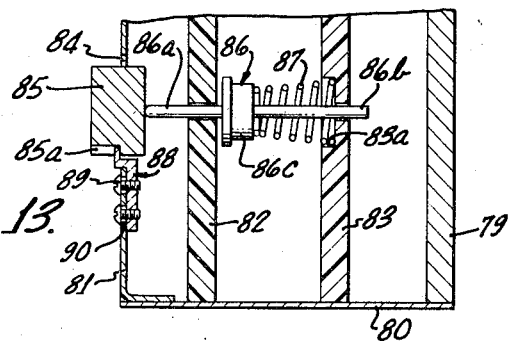
FIG. 13 is a cross-sectional view of a portion of the assembly of FIG. 12 illustrating the means for supporting a transducer.
Figure 14:
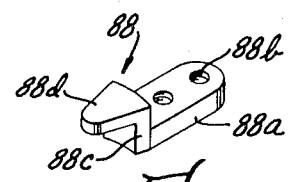
FIG. 14 is a perspective view of one of the individual guides shown in FIG. 12.

In addition to having single probes which are moved by hand to perform test operations, it is sometimes desirable to have multiple probe head assemblies to inspect large surfaces such as laminated panels used in the construction of aircraft bodies. In FIGS. 12–14 there is illustrated a multiple probe head assembly 78 which includes a supporting structure comprising a rear support panel 79 attached to sidewalls 80, and a front panel 81 is parallel to the support member 79 and attached thereto by a plurality of threaded fasteners 81a which are threaded into a flange 80a of the sidewalls 80. Supported within the enclosure defined by the members 79, 80 and 81 are a pair of panels 82 and 83 of insulating material which extend generally parallel to the front and rear members 79 and 81.

The front panel 81 is formed with nine holes 84 arranged in a pattern of three rows of three each. Within each of the holes 84 there is positioned a transducer 85 which is identical to the transducer 16 in FIG. 1, and thus has three axially extending grooves 85a which open to the front face, and has an electrical coating in the grooves, on the front face and on the rear face.

Inward movement of the transducers 85 is limited by the engagement of the rear face of the transducer with a conductive pin 86 which includes a forward portion 86a that extends through the insulated panel 82 and engages coating on the rear face of the transducer, and a rear portion 86b which extends through the insulated panel 83. The conductive pin 86 is further formed with an enlarged shoulder 86c spaced slightly from the rear surface of the panel 82. A compression spring 87 surrounds the rear portion 86b of the conductive pin with the rear end being positioned within a recess 83a in the panel 83 and the other end engaging the rear of the enlarged portion 86c of the conductive pin 86. Thus, it can be seen that the pin is biased forwardly so that the pin end 86a engages the transducer 85, but at the same time the pin may be moved rearwardly against the resiliency of spring 87.

The transducers 85 are limited in their forward and transverse movements by a plurality of individual rigid guides 88 each of which are attached to the front panel 81 by a pair of threaded fasteners 89. The panel 81 is formed with three pairs of apertures 90 with each pair being radially aligned and angularly spaced around the hole 84 to be aligned with the slots in the transducers 85. The diameter of these apertures is larger than the threaded portion of the fasteners 89 but smaller than the heads of the fasteners 89.

The guides 88 include a radially outer main body portion 88a having a pair of radially spaced threaded holes 88b for receiving the threaded fasteners 89. A short axially extending portion 88c extends through the hole 84 in the front panel 81, and an inner radially extending end or tip 88d extends into a groove 85a in the transducer 85. The inner tip of the guide end 88d is curved to conform to the cross section of a groove 85a in the transducer as can be seen from FIG. 12.

Since the inner ends 88d of the transducer guides 88 are visible from the front surface of the assembly 78 the positioning of the transducer with respect to the guides can be easily observed after assembly. If the guides are not exactly aligned or positioned as desired, it is a simple matter to loosen the fasteners 89 for a particular guide and move it either angularly or radially or both to obtain the desired relation with respect to the guide. The enlarged apertures 90 permit this movement. When the desired position is obtained, it is only necessary to tighten the fasteners 89.

The desired relationship is that the transducer be accurately but loosely positioned by the guides so that the transducer may be cocked somewhat to accommodate the surface of the test item and so that the transducer may move inwardly against the biasing of the spring 87. As previously explained, it is important that this movement be accomplished without degrading the electrical coating in the transducer grooves. The positioning of the transducers 85 is particularly critical in a multiple head arrangement in that due to the size of the head and the number of transducers it is necessary that each transducer be free to move somewhat to accommodate the surface of the test item. If a curved surface is involved, the orientation of a transducer 85 on one corner of the pattern in the probe head assembly 78 may be considerably different from the orientation of the transducer on the opposite corner of the pattern.

The electrical circuit through the multiple head assembly of FIGS. 12–14 includes the conductive pin 86 having its rear portion 86b connected to a power source, (not shown) and its forward portion 86a of the conductive pin in contact with the rear conductive coating on the transducer 85. The conductive coating on the forward face of the transducer 85 is connected through the coating in its grooves to the rigid guides 88, which in turn are connected to the front panel 81 that is attached to the rear panel 79 through the sidewalls 80. The rear panel 79 is connected to an electrical ground to complete the circuit.

Figure 15:
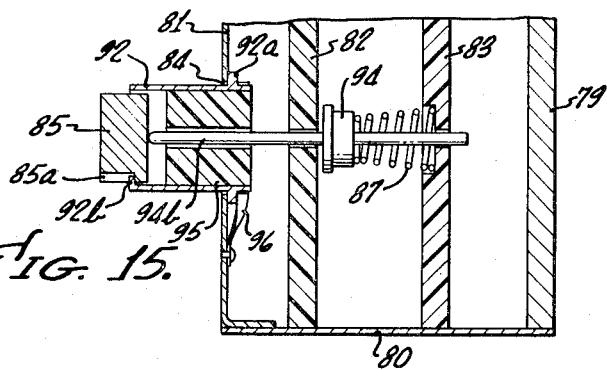
FIG. 15 is a cross-sectional view of another embodiment of the arrangements illustrated in FIG. 12 wherein the transducer is positioned away from the main support surface.
Figure 16:
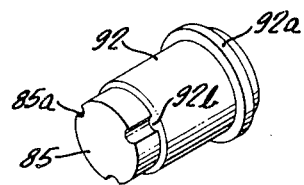
FIG. 16 is a perspective view of the transducer holding element shown in FIG. 15.

Referring now to FIGS. 15 and 16 there is shown a variation of the means for supporting the transducers in a multiple head arrangement of the type shown in FIG. 12. FIG. 15 represents a cross section of a portion of a multiple head assembly comparable to that of the cross section in FIG. 13 except as hereinafter described. Thus, the panels 79, 81, 82 and 83, the coil spring 87 and the transducer 85 are essentially identical to those shown in FIGS. 12 and 13 and hence are numbered identically. The significant difference, however, is the provision of an elongated tubular element 92 which extends loosely through the hole 84 in the front panel 81. The tubular element 92 has an outwardly extending flange 92a which engages the rear face of the front panel 81 as may be seen in FIG. 15. The forward end of the tubular element 92 is provided with three inwardly extending rigid guides 92b which are spaced and dimensioned to fit loosely within the grooves in the transducer 85.

A conductive pin 94 is identical to the pin 86 except that its forward portion 94a is elongated so that it extends into the tubular element 92 to engage the rear face of the transducer 85. Thus, it can be seen that the transducer 85 is loosely positioned in the forward portion of the tubular element 92 and is permitted to move to a limited degree rearwardly and to be cocked somewhat. More specifically, the inwardly extending guides 92b limit the movement of the transducer 85 in a forward direction and in a transverse direction while the forward portion 94a of the conductive pin resists the rearward movement of the transducer 85 in combination with the compression spring 87. A tubular plug 95 made of insulation material fits by friction into the rear of the element 92 to limit the rearward movement of the transducer.

Since the tubular element 92 is only loosely positioned within the holes 84 in the front panel 81, the entire tubular element 92 carrying the transducer 85 may also move rearwardly and be cocked somewhat. The forward movement of the tubular element 92 is limited by the engagement of the flange 92a with the rear of the front panel 81. Its transverse movement is, of course, limited by the panel edges defining the hole 84. The inward or reaward movement of the element 92 is limited by a generally flat spiral spring 96 which surrounds the rear of the element 92, the spring having one attached to the panel 81 in a manner to bias the element forwardly.

The purpose for utilizing the elongated tubular element 92 is to accommodate test surfaces which are considerably curved. Since the transducers 85 are relatively short in an axial direction it would be impossible to obtain good contact between all transducers of a multiple head of the type shown in FIG. 12 if the curvature of the test item is significant. That is, the flatness of the front panel 81 would interfere with such an operation. The provision of the tubular elements 92 enables proper contact to be obtained for each of the transducers even though the test item is considerably curved in that some of the transducers and their supporting tubular elements 92 may be moved inwardly to a considerable degree while others may remain fully extended. The extension provided by the tubular elements also enables the transducers 85 to be cocked more than they would be able to with the arrangement of FIG. 12 in that the transducers can be cocked within the guides 92b to a certain degree and the entire tubular element 92 may be cocked somewhat within the panel holes 84.

As in the previously described arrangements, a conductive path must extend from the coating on the front face of the transducer through the rigid guides 92b, to the front panel 81 which in turn is connected to the rear panel 79. Normally, there will be sufficient contact between the panel 81 and the element 92; however, to insure proper electrical continuity, the spring 86 also provides an electrical path. The remainder of the electrical connections are as described for FIGS. 12–14.

What is claimed is:

1. In an ultrasonic bondtester, having a generally cylindrical transducer with an outer face for contacting the surface of a test item and having sidewalls with groove means formed therein, said transducer being made of a material which is a relatively poor electrical conductor with a coating of good electrically conductive material formed on said outer face and on said groove means with a conductive path extending between the groove means and the outer face, improved means for holding said transducer comprising:

guide means cooperating with said groove means for loosely positioning and guiding said transducer in a manner to permit limited movement of the transducer in the holder means with a minimum of friction on the transducer so as to maintain the integrity of the coating within said groove means;

said groove means comprising an annular groove spaced axially from said outer face; and said guide means including a tubular holder having an annular groove aligned with the annular groove in said transducer, and a retaining ring which fits within said grooves to limit axial and radial movement of the transducer relative to the holder.

2. In an ultrasonic bondtester, a probe head assembly including:

a supporting panel having a pattern of openings formed therein;

a tubular guide element extending loosely through each of said openings so that the element can move axially and be cocked transversely a limited amount, means formed on each element for limiting its outward axial movement:

an axially short transducer positioned with its side walls in the end of each guide element, and having an outer face for engaging a test item; and means formed on the outer end of each element and on the side walls of each transducer for loosely retaining each transducer in its guide element while permitting limited axial and transverse cocking movement, whereby the probe head assembly can accommodate a curved test item with the outer face of each transducer in contact with the test item.

3. The probe head assembly of claim 2 wherein:
each transducer has a plurality of axially extending grooves formed in its side walls and extending from its outer face to a point spaced from the inner face of the transducer; and
the outer end of each guide element is formed with a plurality of inwardly extending rigid guides which fit loosely within said grooves.

4. In an ultrasonic bondtester, having a transducer with an outer face for contacting the surface of a test item and having sidewalls with groove means formed therein, said transducer being made of a material which is a relatively poor electrical conductor with a coating of good electrically conductive material formed on said outer face and on said groove means with a conductive path extending between the groove means and the outer face, improved means for positioning said transducer comprising:
a supporting member having a rigid annular portion defining an opening for receiving said transducer;
a plurality of rigid guides supported by said member and extending radially inwardly from the annular portion in approximately the same plane as the annular portion, the guides being arcuately spaced around said opening, and
means for radially and arcuately adjusting said guides relative said supporting member, and for removing said guides from said supporting member to allow removal of said transducer from said supporting member.

5. The bondtester of claim 4 wherein:
said supporting member has a plurality of arcuately spaced apertures surrounding the opening; and
said guides are formed with one or more apertures for individual mounting of the guides; and
including fasteners extending through said apertures for attaching said guides to said member, the apertures in either said member or said guides being oversized with respect to said fasteners so that each of the guides may be adjusted both arcuately and radially to insure accurate positioning of the transducer by said guides.

6. In an ultrasonic bondtester having a generally cylindrical transducer with an outer face for contacting the surface of a test item, said transducer being made of material which is a relatively poor electrical conductor with a coating of good eletcrically conductive material formed on said outer face, improved means for supporting said transducer comprising:
means defining an annular groove in the outer cylindrical surface of the transducer spaced axially from its outer face, an electrically conductive coating formed in said groove and a conductive path extending between the groove and the outer face of the transducer;
an elongated tubular holder having an outer socket for receiving said transducer said socket having an opening through the wall thereof axially aligned with said annular groove in said transducer; and
rigid means inserted through said opening and supported by said socket, extending around the annular groove in said transducer for limiting the radial and axial movement of the transducer in the socket.

7. The supporting means of claim 6 wherein said socket has an annular groove formed on its inner cylindrical wall axially aligned with the transducer groove, and said means inserted through said opening comprises a retaining ring which fits within the transducer groove and the socket groove.

References Cited
UNITED STATES PATENTS

| | | | |
|---|---|---|---|
| 2,494,433 | 1/1950 | Erwin | 310—9.1 X |
| 2,556,558 | 6/1951 | Silverman | 310—9.1 X |
| 2,803,129 | 8/1957 | Bradfield | 310—9.1 X |
| 3,119,254 | 1/1964 | Schlieklmann et al. | 73—71.5 |
| 3,239,801 | 3/1966 | McGaughey. | |
| 3,379,901 | 4/1968 | Richards | 310—9.1 X |
| 3,393,331 | 7/1968 | Puckett | 310—9.1 X |

MILTON O. HIRSHFIELD, Primary Examiner

M. D. BUDD, Assistant Examiner

U.S. Cl. X.R.

73—71.5; 310—9.7